United States Patent [19]

Klein

[11] 4,224,272
[45] Sep. 23, 1980

[54] BLOW-MOLDING NOZZLE AND METHOD

[75] Inventor: Josef Klein, Troisdorf-Sieglar, Fed. Rep. of Germany

[73] Assignee: Reifenhäuser KG, Troisdorf, Fed. Rep. of Germany

[21] Appl. No.: 963,172

[22] Filed: Nov. 24, 1978

[30] Foreign Application Priority Data

Nov. 26, 1977 [DE] Fed. Rep. of Germany ....... 2752932

[51] Int. Cl.² ............................................. B29F 3/04
[52] U.S. Cl. ................................... 264/209; 264/563;
264/310; 425/192 R; 425/326.1; 425/376 A;
425/380; 425/467
[58] Field of Search ................. 264/573, 563, 209, 310;
425/376 A, 380, 192, 326.1, 461, 465–467

[56] References Cited

U.S. PATENT DOCUMENTS

| 3,193,879 | 7/1965 | Corbett | 425/461 |
| 3,212,134 | 10/1965 | Yokana | 264/209 |
| 3,491,406 | 1/1970 | Davidson | 425/376 A |
| 3,689,192 | 9/1972 | Upmeir | 425/467 |
| 3,756,758 | 9/1973 | Prall | 425/467 |
| 3,769,397 | 10/1973 | Cook et al. | 264/209 |
| 3,809,515 | 5/1974 | Farrell | 425/467 |

Primary Examiner—Jeffery R. Thurlow
Attorney, Agent, or Firm—Karl F. Ross

[57] ABSTRACT

A nozzle assembly has an upstream part which transforms a solid thermoplastic-resin strand into an upstream tube section which is centered on an axis and flows axially. Formations inside this upstream part impart rotation about the axis to at least a portion of the material of the upstream tube section. This upstream tube section is then deflected by a distributor radially outwardly and then forced through a plurality of generally angularly equispaced radially extending throttle passages in a throttle ring. The individual solid streams issuing from this throttle ring are united into a downstream tube section that is passed axially through a downstream nozzle part which is also provided with formations that impart rotation about the axis to at least a portion of the material of the downstream tube section. Eventually the tube issues from the downstream end of the downstream nozzle part as a large-diameter tube suitable for blow molding.

7 Claims, 4 Drawing Figures

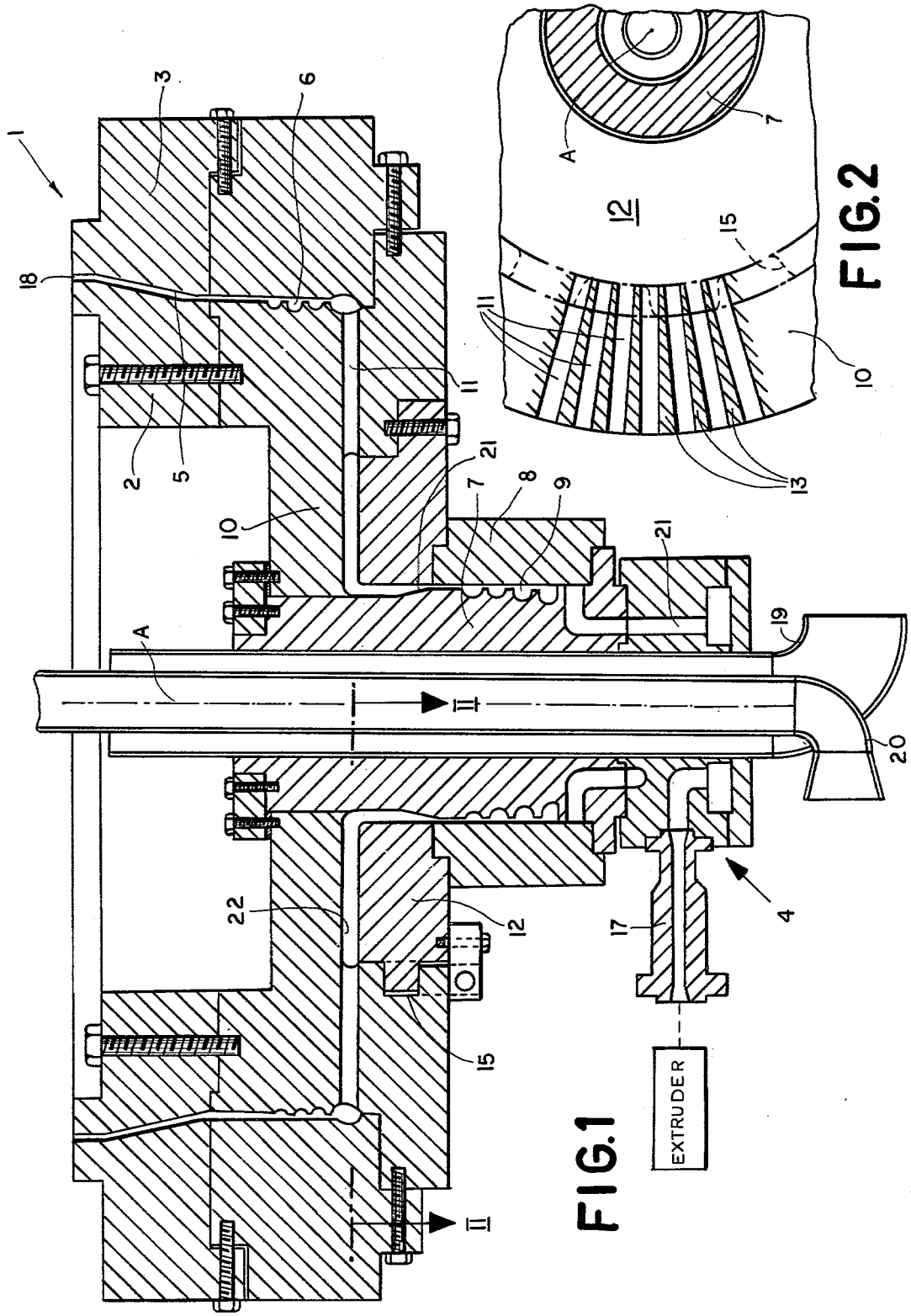

BLOW-MOLDING NOZZLE AND METHOD

FIELD OF THE INVENTION

The present invention relates to a blow-molding nozzle and method. More particularly this invention concerns the conversion of a continuously extruded and solid synthetic-resin strand into a large-diameter tube suitable for blow molding.

BACKGROUND OF THE INVENTION

In order to form a large-diameter synthetic-resin tube suitable for conversion into a succession of bags or the like, it is necessary to transform a small-diameter solid strand of a thermoplastic resin such as polyethylene into a relatively large-diameter tube. This relatively large-diameter tube can be made even larger by inflation with a gas that also serves to cool and harden the resin.

This operation is normally done by a nozzle assembly having at one end a small-diameter inlet that receives the continuously extruded and solid synthetic-resin strand, and at its other end a large-diameter annular orifice from which the large-diameter tube issues. Between these two ends the nozzle is formed internally with an annular and elongated passage centered on an axis. In this passage there is provided a mixing formation, in the form of a so-called spiral or helical distributor, which ensures that the solid strand is mixed thoroughly to form a homogeneous tube.

In order to ensure that the tube issuing from the outlet is perfectly homogeneous, it is necessary normally to make the nozzle assembly axially relatively long. In this manner the resin flows along a relatively long path and in this path the gaps between portions of the resin are largely eliminated with good homogenization of the resin. The disadvantage of this system is plainly that such a nozzle assembly is expensive to manufacture and maintain due to its large size. Furthermore such a large size requires that the entire production unit also be relatively long.

OBJECTS OF THE INVENTION

It is therefore an object of the instant invention to provide an improved blow-molding assembly and method.

Another object is to provide an improved and novel assembly which has a relatively short axial length, but which nonetheless produces a perfectly homogeneous tube.

A further object is to provide an improved method of transforming a small-diameter solid strand into a large-diameter tube with flow of the material in the nozzle assembly through a minimal axial distance.

SUMMARY OF THE INVENTION

These objects are attained according to the instant invention in a nozzle assembly having upstream and downstream mold parts forming respective generally annular upstream and downstream mold passages generally centered on an axis. These upstream and downstream parts are provided with respective upstream and downstream guide means which impart generally rotary flow about the axis to at least a part of the fluid mass flowing in the respective passage. The upstream passage terminates at an upstream distributor mounted on the upstream part and oriented to deflect the mass issuing from the upstream passage radially outwardly. Mounted on this distributor is a throttle ring which has a plurality of generally angularly equispaced and radially spaced throttle passages each having an inner end receiving the fluid mass from the distributor and an outer end which feeds the mass to the upstream intake end of the downstream passage. The fluid mass issues from the outlet at the downstream end of the downstream passage as a homogeneous tube.

The nozzle assembly according to the instant invention therefore forms the solid strand issuing continuously from an extruder into an upstream tube section which is centered on the axis and which flows along this axis. Rotation is imparted to at least a portion of the material of this upstream tube section which is deflected radially outwardly at its downstream end into the throttle ring where it is subdivided into a plurality of radially outwardly flowing separate and solid streams. These streams are united in a downstream tube section and caused to flow axially along the downstream tube section. Rotation is imparted to at least a portion of the material of the downstream tube section which is finally expelled at its downstream end into the atmosphere. The use of two separate spiral-type distributors and a radially effective throttle ring ensures that a relatively large pressure drop is created between the outlet of the nozzle assembly whence the large-diameter tube is expelled and the small-diameter inlet for the solid strand. Thus an extruder operating at high pressure can be used with a relatively short mold assembly without disadvantageously depressurizing the interior of the extruder. What is more the tube extruded at the outlet of the downstream part of the mold will be almost perfectly homogeneous so that relatively high-quality and uniform articles can be produced from it.

According to further features of this invention throttle passages are cylindrical and of uniform and constant cross section. The throttle ring has webs defined between these passages which increase in thickness measured along a tangent to an imaginary cylinder centered on the mold axis outwardly from this axis. The considerable surface area over which the resin must flow in these throttle passages creates enormous sheer and, therefore, retards the displacement of the resin mass so that a relatively great pressure drop can be achieved in a relatively short axial space.

According to another feature of this invention a bayonet coupling is provided between the distributor and the throttle ring. Thus it is possible in a relatively easy manner to disassemble the nozzle assembly and switch throttle rings. A ring with smaller-diameter throttle passages can be used for a less viscous synthetic resin, for example, so that a single basic mold assembly can be used for many different applications.

BRIEF DESCRIPTION OF THE DRAWING

FIG. 1 is an axial section through a mold assembly according to this invention;

FIG. 2 is a section taken along line II—II of FIG. 1;

SPECIFIC DESCRIPTION

Figure 3:
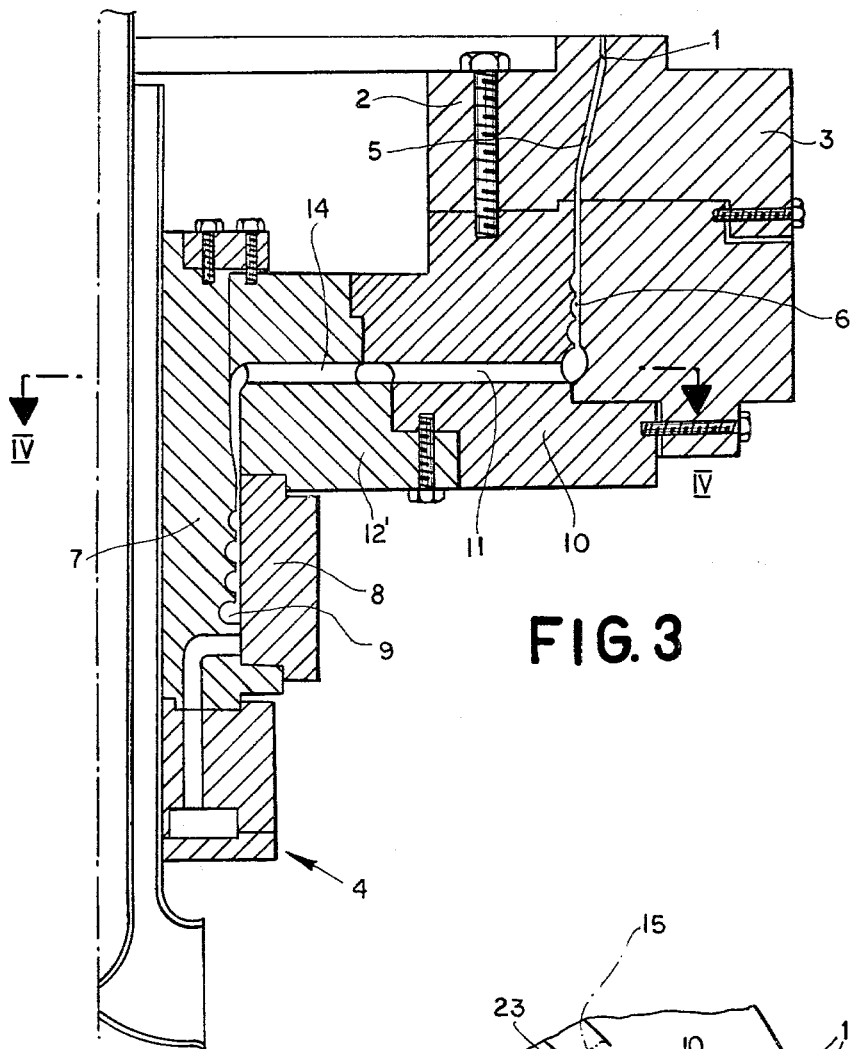
FIG. 3 is an axial section through a portion of another mold assembly according to this invention.

A nozzle assembly 1 as shown in FIGS. 1 and 2 is adapted for use with an extruder 16 that produces a continuous and solid small-diameter strand of a synthetic resin such as polyethylene. This solid strand is applied to a radially extending inlet fitting 17 constituting part of a feed device 4 mounted on the bottom of the mold assembly 1. At its upper end the strand emerges from the mold assembly 1 between an inner part 2 and an outer part 3 at an outlet orifice 18. Tubes 19 and 20 serve to blow a relatively cool gas into the interior of the tube thus formed and to evacuate it therefrom continuously as the tube is expelled from the opening 18 which is formed at the extreme downstream end of an annular passage 5 formed between the parts 2 and 3.

Inside the mold assembly 1 a core 7 and a sleeve 8 define an upstream passage 21 formed with a helical runner region 9 constituted as a helical groove formed in the core 7 and of decreasing depth in a downstream direction. Passages 21 in the feed device 4 conduct the solid strand from the inlet fitting 17 to the bottom of the upstream passage 21.

A deflector 12 mounted on the top of the sleeve 8 forms with a ring 10 a circularly annular deflection passage or chamber 22 extending radially of the central axis A of the device from the downstream end of the passage 21.

As also seen in FIG. 2 this ring 10 constitutes a throttle ring and is formed with a multiplicity of perfectly radially extending cylindrical bores 11 of regular cross-sectional shape. Between these bores or passages 11 the ring 10 is formed with webs 13 which are of increasing thickness outwardly from the axis A.

At their other ends the passages 11 open into the lower end of the annular passage 5 which is provided adjacent this lower end with another helical distributor 6.

Thus a solid strand enters the fitting 17 from the extruder and is formed into a small-diameter upstream tube section in the passage 21. At its downstream end the tube section in the passage 21 is deflected radially outwardly in the chamber 22 and then is forced through the passages 11 which subdivide it into a multiplicity of identical cylindrical streams. In turn these streams are reunited at the base of the passage 5 and remixed at the formation 6 so that a perfectly homogeneous large-diameter tube can issue from the outlet 18 of this passage 5.

A bayonet coupling 15 is provided between the ring 10 and the distributor 12 so that the ring 10 can be switched with another having passages 11 of different dimensions.

Figure 4:
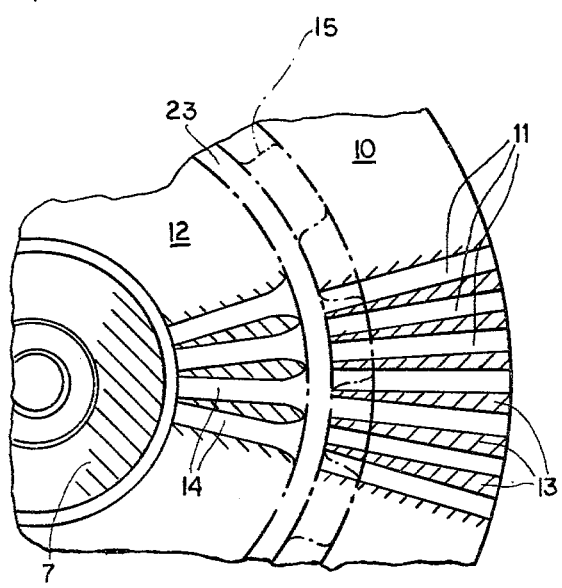
FIG. 4 is a section taken along 1 ne IV—IV of FIG. 3.

FIGS. 3 and 4 show how the passage 22 from the distributor ring 12 and the throttle ring 10 can be replaced by a multiplicity of passages 14 formed in a throttle ring 12'. These passages 14 are half as numerous as the passages 11, that is each of the passages 14 opens adjacent a pair of the passages 11. An annular manifold chamber 23 is formed in the outer downstream ends of the passages 14 and the inner upstream end of the passages 11.

I claim:

1. A nozzle assembly comprising:
    an upstream mold part forming a generally annular small-diameter upstream mold passage generally centered on an axis;
    upstream guide means in said upstream passage for imparting rotation about said axis to at least a part of a fluid mass flowing through said upstream passage;
    an upstream distributor mounted on said upstream part and oriented to deflect the mass issuing from said upstream passage radially outwardly;
    a throttle ring mounted on said distributor and having a plurality of generally angularly equispaced and radially extending substantially cylindrical throttle passages each having an inner end receiving the fluid mass from said distributor and an outer end;
    a downstream part forming a generally annular large-diameter downstream passage generally centered on said axis having an annular intake end at said outer ends of said throttle passages and an outlet; and
    downstream guide means in said downstream passage for imparting rotation about said axis to at least a part of the fluid mass flowing through said downstream passage, whereby said mass issues from said outlet as a large-diameter homogeneous tube.

2. The assembly defined in claim 1 wherein said ring is formed with radially extending webs between said throttle passages and of radially inwardly increasing thickness, whereby said webs have relatively thin inner ends and relatively thick outer ends.

3. The assembly defined in claim 1 wherein said distributor is formed with a plurality of generally angularly equispaced and radially extending distributor passages extending between said upstream passages and said throttle passages.

4. The assembly defined in claim 3 wherein said throttle passages number generally twice said distributor passages.

5. The assembly defined in claim 1, further comprising a bayonet coupling between said throttle ring and said distributor.

6. A method of making a homogeneous large-diameter tube from a continuous extruded solid strand of a thermoplastic synthetic resin, said method comprising the steps of continuously and concomitantly:
    forming said solid strand into a small-diameter upstream tube section centered on an axis and flowing said upstream tube section along said axis;
    imparting to at least a portion of the material of said upstream tube section a rotation about said axis;
    deflecting said upstream tube section at its downstream end radially outwardly;
    subdividing the radially outwardly deflected section into a plurality of radially outwardly flowing separate, substantially cylindrical, and solid streams;
    uniting said streams into a large-diameter downstream tube section and flowing same axially;
    imparting to at least a portion of the material of said downstream tube section a rotation about said axis; and
    expelling said downstream tube section at its downstream end as a large-diameter tube into the atmosphere.

7. The method defined in claim 6 wherein all of said steps except the step of expelling are carried out within the confines of a nozzle assembly.

* * * * *